United States Patent
Jones

[11] 4,043,719
[45] Aug. 23, 1977

[54] APPARATUS FOR PRODUCING RIGID FOAM PLASTIC LAMINATED BOARD

[75] Inventor: William R. Jones, St. Petersburg, Fla.

[73] Assignee: The Celotex Corporation, Tampa, Fla.

[21] Appl. No.: 646,334

[22] Filed: Jan. 2, 1976

[51] Int. Cl.² .............................................. B29D 27/04
[52] U.S. Cl. .................................. 425/115; 264/46.2; 264/46.5; 425/224; 425/371; 425/817 C
[58] Field of Search .................... 264/45.8, 46.2, 46.3, 264/46.5; 425/4 C, 817 C, 505, 329, 224, 371, 372, 174.8 R, 89, 115; 156/78, 79

[56] References Cited

U.S. PATENT DOCUMENTS

| | | | |
|---|---|---|---|
| 3,435,102 | 3/1969 | Sullhofer | 425/4 C X |
| 3,761,209 | 9/1973 | Hanton | 425/174.8 R X |
| 3,836,298 | 9/1974 | Ernst | 425/817 C X |
| 3,994,648 | 11/1976 | Kornylak et al. | 425/150 |

Primary Examiner—Francis S. Husar
Assistant Examiner—Mark Rosenbaum
Attorney, Agent, or Firm—James W. Grace

[57] ABSTRACT

An apparatus for making a laminated board having a foam plastic core between adhered sheets has limiting means for inhibiting escape of the foam plastic core outwardly of the sheets.

4 Claims, 4 Drawing Figures

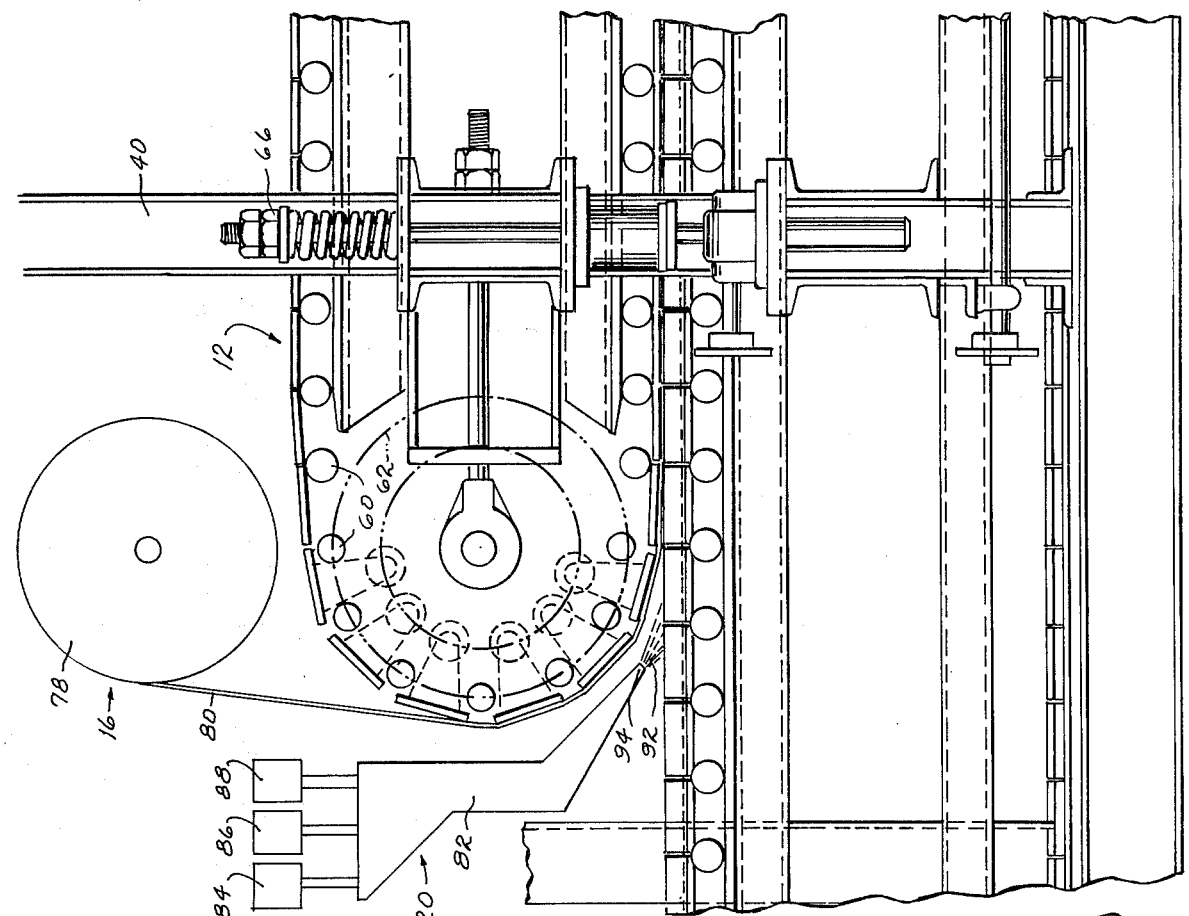
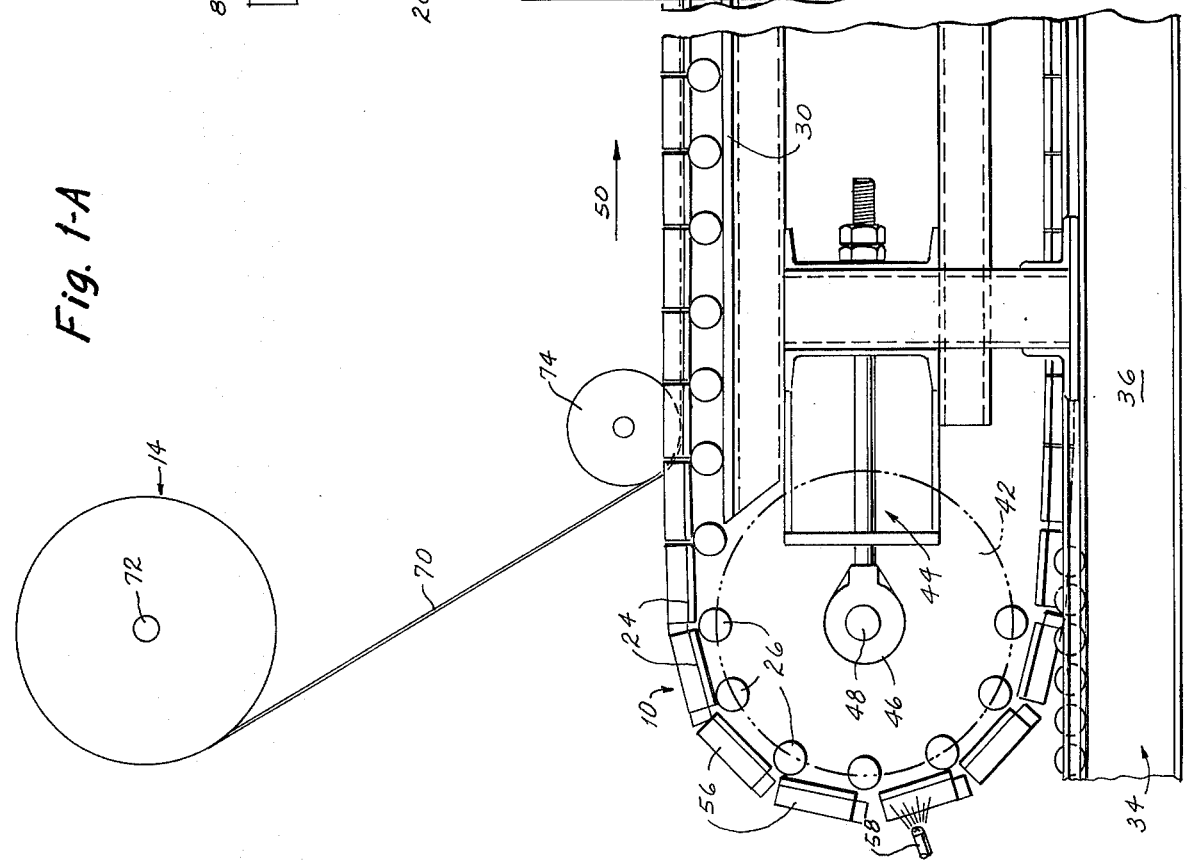
Fig. 1-A

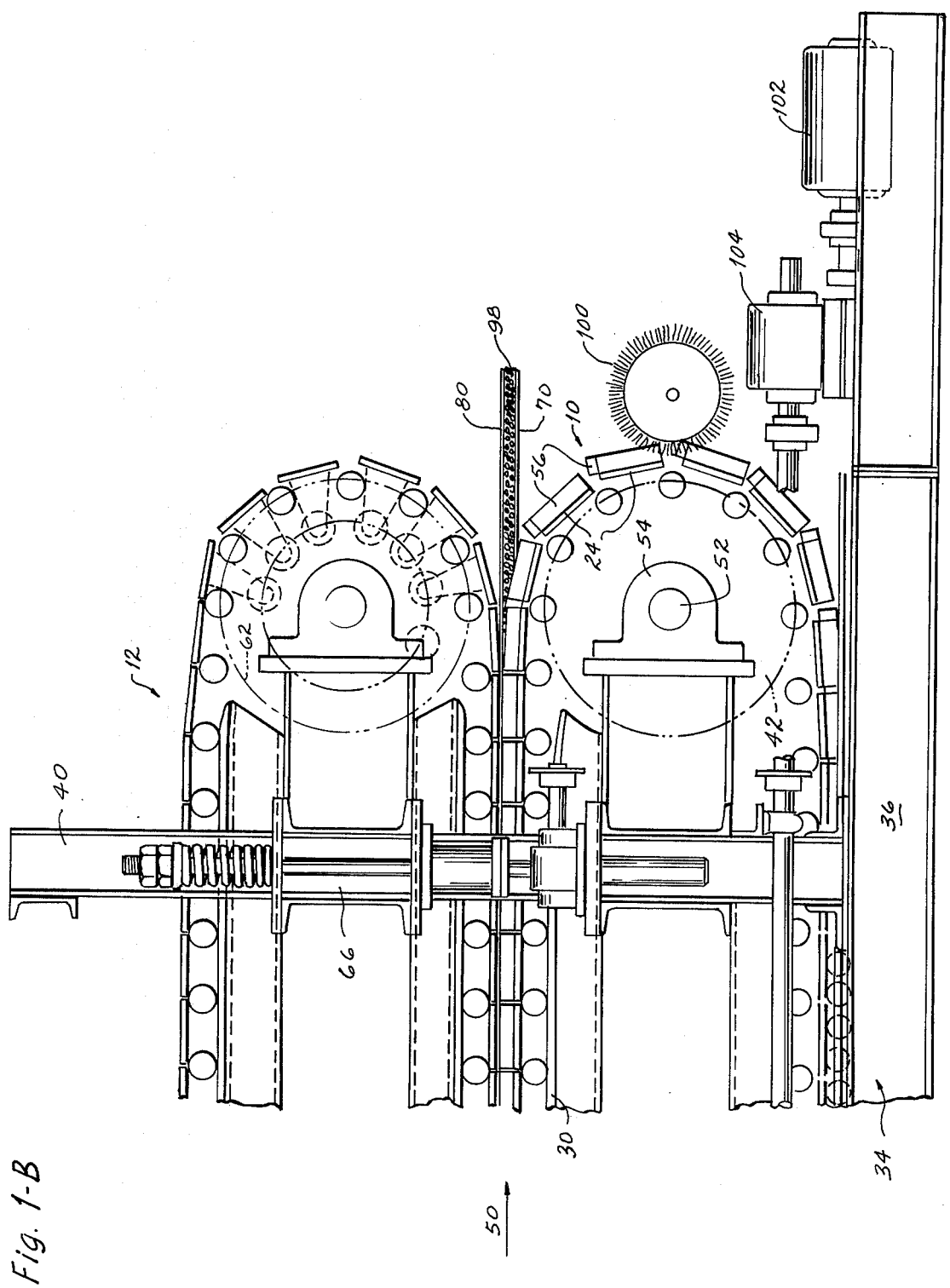
Fig. 1-B

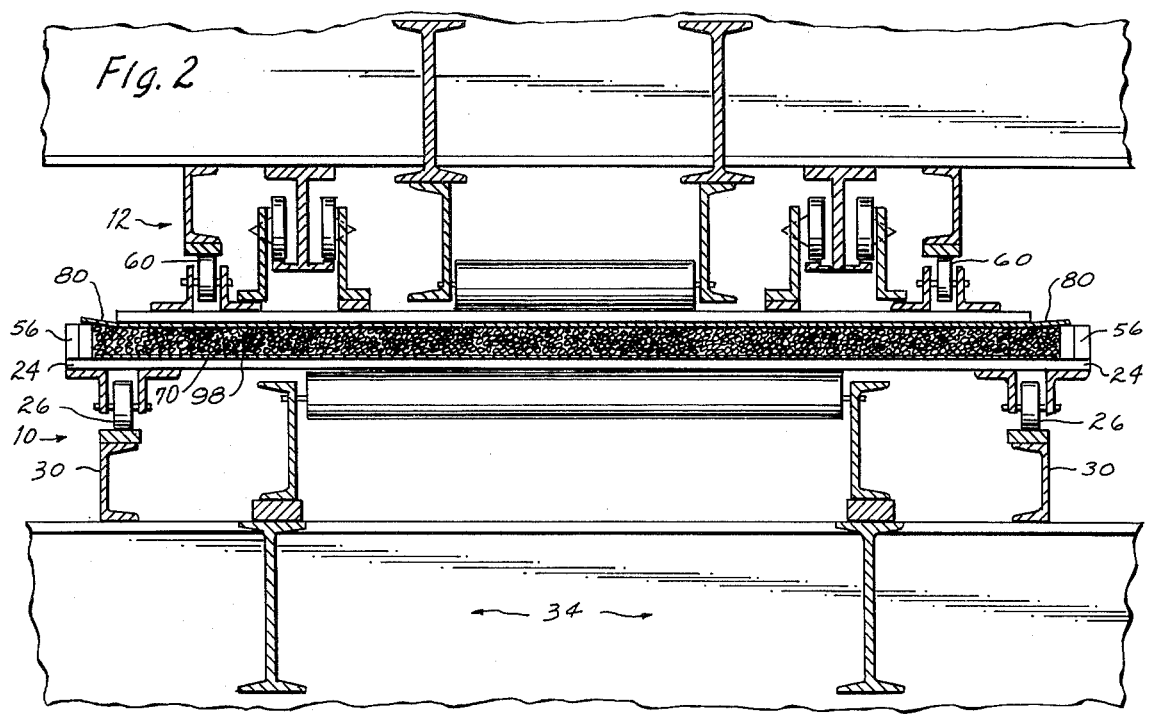
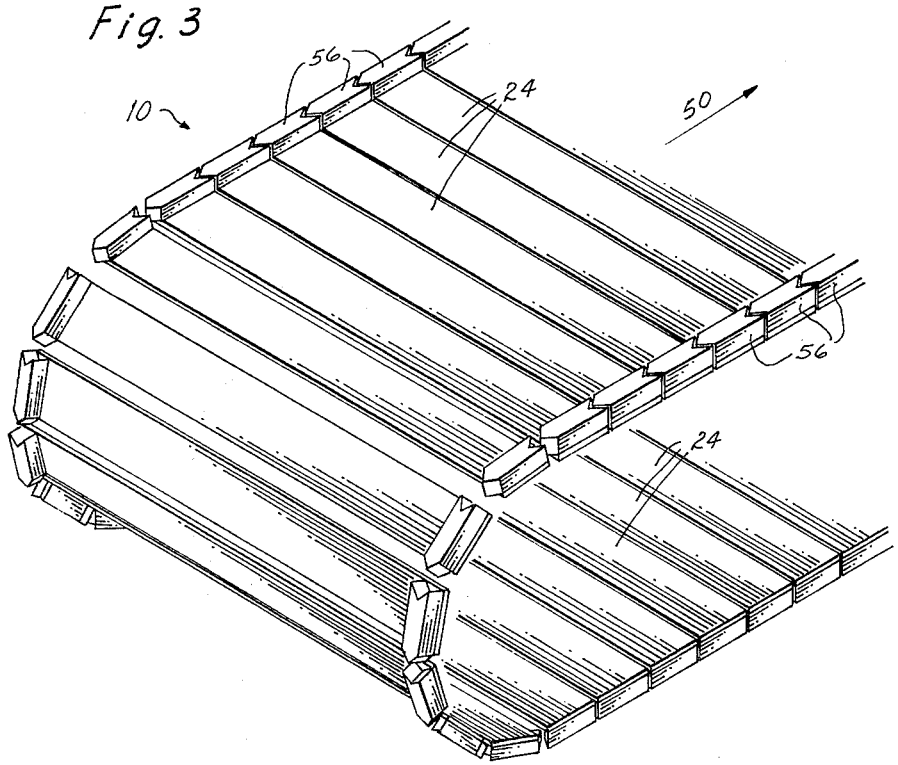

APPARATUS FOR PRODUCING RIGID FOAM PLASTIC LAMINATED BOARD

BACKGROUND OF THE INVENTION

1. Field of the Invention

This invention relates to laminated rigid boards which have outer sheets adhered to a plastic foam core. These boards find use as heat insulating panels in construction. They have very high insulation value compared to other types of insulation and because of their light weight are easily handled and applied. The present invention will be described in the environment of making a roof insulation sheet, although the teachings of the invention should not be so limited.

2. Description of the Prior Art

The prior art process for making such boards is a continuous process in which a liquid of formable plastic is deposited between two sheets and is allowed to expand against parallel spaced platens on upper and lower conveyors. Since the foam core expands in all directions, it has been the practice to have the enclosing sheets be substantially wider than the desired width of the final product. The foam core hardens and ridigifies as a chemical reaction continues. As the rigid board is removed from the outlet end of the conveyor, trim saws cut the excess material along the longitudinal edges of the board to produce a board of predetermined width. The excess trim material presents a disposal problem, as well as an added cost in raw materials which must be discarded.

For example, it has been customary in producing a board of 48 inch width to have the foam extend as much as 5 inches or more on each side of the machine. The resulting losses in trim material are substantial.

SUMMARY OF THE INVENTION

The invention is directed to an apparatus in which blocks are secured to the edges of the platens to prevent the foam from oozing out beyond the edges of the platens and in which the top sheet is stiff enough to form an enclosure for the foam. It has been unexpectedly found that the height of the limiting means is to a great extent independent of the thickness of the board. Thus, the apparatus can be adjusted to produce boards of various thicknesses without changing the limiting means.

It is an object of this invention to provide a novel apparatus for making rigid foam plastic board in a continuous process with a minimum of waste.

It is another object of this invention to provide a novel apparatus for making rigid foam plastic boards of different thicknesses with a minimum adjustment of the apparatus.

BRIEF DESCRIPTION OF THE DRAWING

Other objects and advantages of the invention will become apparent to those skilled in the art from a consideration of the attached drawing in which like numerals indicate like elements and in which:

FIGS. 1A and 1B form a composite side elevation of the apparatus of the invention, FIG. 2 is a cross-sectional view taken along lines 2—2 of FIG. 1, and FIG. 3 is a perspective view showing a portion of the apparatus of FIG. 1 in greater detail.

Referring now to FIG. 1, there is shown an apparatus for producing boards with outer sheet laminated to a foam plastic core. At the extreme left of FIG. 1 is an input section of the apparatus which comprises a lower conveyor 10 and upper conveyor 12 in spaced parallel relation with lower conveyor 10, sheet unwind stations 14 and 16 and a foam plastic deposit station 20. It will become apparent that the invention does not lie in the mechanism for moving the various parts of the apparatus, and so for simplification of description, the various power sources, drive chains, operating switches and other details will not be described. The basic apparatus has been fully described in such U.S. Pats. as No. 2,866,730, issued Dec. 30, 1958 to J. A. Potchen et al.; U.S. Pat. No. 2,929,793, issued Mar. 22, 1960 to J. J. Hirsh; and U.S. Pat. No. 3,215,581 issued Nov. 2, 1965, and the detailed disclosure of these patents is incorporated herein by reference. In addition, the chemistry involved is also well known to those skilled in the art of rigid foam plastic boards. Such foam plastics as polyvinyl chloride foam (U.S. Pat. No. 2,292,793); foamed polystyrene and foamed cellulose acetate (U.S. Pat. No. 2,866,730); polyurethane (U.S. Pat. No. 3,215,581); and polyisocyanurate (U.S. Pat. No. 3,799,896 issued Mar. 26, 1974 to Ernest K. Moss) may be used as the foam core material. For purposes of this invention, it is sufficient to understand that an unfoamed liquid of plastic material is deposited between upper and lower sheets at or near the convergence of the upper and lower conveyors and that the ingredients in this liquid react so as to form a rapidly expanding foam.

The distance between the horizontal planes of the facing portions of the two conveyors can be preset to determine the thickness of the final board.

More specifically FIG. 1A shows lower conveyor 10 comprising a series of articulated platens 24 which extend across the apparatus. Platens 24 are rectangular in shape and abut each other along corresponding edges as they move along in a horizontal plane to form a support for the bottom of the foam plastic board. Platens 24 are supported on journalled rollers 26 which ride on guide tracks 30 (see FIG. 3) on a frame 34. Frame 34 has a basic beam structure 36 with upstanding channels 40 to support conveyor 10. Each end of conveyor 10 has a roller 42 around which conveyor 10 is guided. Lefthand roller 42 has a tension adjusting support system 44 connected to a journal 46 supporting axial shaft 48 of roller 42. Shaft 48 of roller 42 may be rotationally driven by any suitable power means to cause conveyor 10 to move so that the upper plane of platens 24 move to the right as shown by arrow 50. Righthand roller 42 has its axial shaft 52 supported for rotation in a pillow block bearing 54 which is secured to upstanding channel 40 and thus to basic frame 34.

Each platen 24 has secured at each of its ends a steel block 56 (shown in greater detail in FIG. 3). The two steel blocks 56, each along an outer edge of platen 24, serves as a limiting means to confine the foam plastic core material within a predetermined width.

Upper conveyor 12 likewise comprises platens 24 which are supported on rollers 60 and by spaced end rolls 62 much in the manner discussed with respect to the lower conveyor 10. Upper conveyor 12 is secured to upstanding channels 40 by adjustable connectors 66 by means of which the distance between the facing platens 24 of lower conveyor 10 and upper conveyor 12 can be established. By adjusting connectors 66, the thickness of the final board can be present. It is not necessary nor desirable to have steel blocks 56 on the upper platens.

A roll of suitable cover sheet 70 is placed on an unwind axle 72 and lead over a roller 74 to rest on the upper surface of the platens 24 on the lower conveyor 10. The cover sheet may be heavy paper, aluminum foil, or, in the case of a roofing insulation board, an asphalt impregnated roofing felt. The particular nature of the sheet is not essential to the invention but the sheet is selected in accordance with the characteristics desired in the board. Other foil or flexible sheets may be used, if desired.

A second roll 78 of sheet material 80 is located above upper conveyor 12 and lead downwardly along the underside of upper platens 24. Sheet 80 may again be of any suitable material, as described with respect to cover sheet 70. Sheet 80 may be the same or different from sheet 70 as desired by the producer.

To introduce the foam plastic material between the sheets 70 and 80, a distributor 82 is arranged to reciprocate across the width of the apparatus and deposit a layer of liquid upon lower sheet 70 near the point where upper sheet 80 and lower sheet 70 near the point where upper sheet 80 and lower sheet 70 approach each other. The chemical ingredients of the liquid are fed into the distributor 82 from various sources 84, 86, and 88 which are lines connected to pumps (not shown) which in turn are fed from storage tanks or vats (not shown). The liquid chemicals 92 are mixed in a high speed spiral mixer inside distributor 82 and deposited through a nozzle 94 onto sheet 70.

The mechanical arrangement for the transverse reciprocating movement of the distributor 82 can be similar to that illustrated and described in U.S. Pat. No. 2,841,205 issued on July 1, 1955 to W. F. Bird. A description of the details of this part of the apparatus is not necessary to an understanding of the invention.

The chemical reaction for a typical polyurethane foam plastic core is fully described in U.S. Pat. No. 3,215,581 discussed hereinbefore. Broadly a polyether resin and a fluorocarbon blowing agent are fed to distributor 82 over line 84; a catalyst such as dibutyl tin dilaurate is fed to distributor 82 over line 86 and a polymethylene polyphenyl isocyanate is fed through line 88 to distributor 82. The ingredients are rapidly mixed in the distributor and deposited in liquid form on sheet 70. The reaction of the chemicals is an exothermic reaction and the volatile foaming agent (fluorocarbon) boils within the range of 60°-110° F. to aid in the foaming reaction.

The sheets 70 and 80 are moved to the right in the apparatus with the foam core rising between the sheets until the foam sandwich is confined between the platens 24 of conveyors 10 and 12.

For a more detailed explanation of the nature of the invention reference may be had to FIG. 2 which is a cross-sectional view of a portion of the apparatus. Only those features essential to describing the invention will be discussed. Foamed core 98 is formed by the reaction of the chemical ingredients 92 deposited on lower sheet 70 and a sandwich type board results with sheets 70 and 80 enclosing the top and bottom of the core 98. Limiting blocks 56 are secured along the outer edges of each of lower platens 24. Lower sheet 70 is cut so that its width is equal to the distance between the two limiting blocks and it lies flat upon the upper surface of lower platen 24.

It will be noted that it is not necessary that the transverse width of upper platens 24 be equal to that of lower platens 24. Rather the transverse width of the upper platens is less than that of the lower platens. However, upper sheet 80 must be of greater transverse width that the distance between limiting blocks 56 so that the outer longitudinal edges of upper sheet 80 lie over the top of limiting blocks 56, thus in effect forming a closed system for the expanded foam core 98.

It has been unexpectedly found that the foam core will expand only minimally outside of the confined area presented by lower sheet 70, upper sheet 80, and the two limiting blocks 56. It has also been found that the height of limiting blocks 56 need not be the same as the final thickness of the board. Thus, for boards having a thickness between 0.5 inch and 1 ¼ inch, blocks of 1 inch thickness may be used. For a board having a thickness between 1θ inch up to 2 inches, blocks of 2 inches thickness may be used. Thus, there is a distinct savings in inventory of limiting blocks and in the amount of labor required to change the blocks as the thickness of the board varies.

At the left hand edge of lower conveyor 10 is a nozzle 58 through which is sprayed a release coating material, such as a detergent or silicone, which acts as a release mechanism to keep any of the foaming core material from sticking to the blocks 56. If desired, a rotating brush 100 (shown at the right hand end of conveyor 10) may be used to further clean blocks 56 of any residual foam core material.

A suitable power source 102 and gear box 104 are shown in schematic form attached to frame member 34. For simplicity of discussion, the power source 102 and its connections to the various rotating elements will not be described.

FIG. 3 shows an added feature of alignment of the blocks 56. By having V-shaped leading and trailing edges, the blocks interengage and are held in rigid alignment.

In summary, there is described an apparatus for making rigid laminated boards using limiting blocks to determine the width of the boards in a simplified and economical manner.

I claim:

1. In an apparatus for making a foam plastic laminated board having a foam plastic core encased between an upper and a lower sheet member and in which said apparatus has a lower conveyor comprising abutting platens forming a continuous support surface in a horizontal plane, and an upper conveyor settably spaced from said lower conveyor, said conveyor having abutting platens forming a continuous limiting surface in a plane parallel to said horizontal plane of said lower conveyor and a pair of sheet unwind stations adjacent said conveyors adapted to provide said upper and said lower sheet members to said upper and lower conveyors, respectively, the improvement comprising having said platens of said upper conveyor shorter in a transverse direction than said platens of said lower conveyor, spaced limiting means attached along outer edges of each platen of said lower conveyor, said limiting means being located outwardly of the outer edges of said platens of said upper conveyor, said lower sheet having a width such that said lower sheet substantially spans the distance between said limiting means on said lower conveyor and said upper sheet having a width such that the outer edges of said upper sheet overlay said limiting means.

2. In an apparatus as recited in claim 1, the improvement in which the height of said limiting means is substantially independent of the height of said settable spacing between said upper and lower conveyor planes.

3. In an apparatus as recited in claim 1, the improvement in which said limiting means comprises blocks of metal having sufficient stiffness to prevent deformation of said blocks.

4. In an apparatus as recited in claim 3 the improvement in which said blocks have V-shaped leading and trailing edges for interengagement of abutting blocks.

* * * * *